March 27, 1962 W. M. BERG 3,026,737
BELT TRANSMISSION SYSTEM
Filed July 22, 1960

INVENTOR.
WINIFRED M. BERG
BY James and Franklin
ATTORNEYS

United States Patent Office 3,026,737
Patented Mar. 27, 1962

3,026,737
BELT TRANSMISSION SYSTEM
Winfred M. Berg, East Rockaway, N.Y., assignor to Pic Design Corp., East Rockaway, N.Y., a corporation of New York
Filed July 22, 1960, Ser. No. 44,718
15 Claims. (Cl. 74—229)

The present invention relates to an improved belt transmission system comprising a transmission belt of improved design and rotatable elements specially adapted to be used in conjunction therewith.

The use of flexible drives for connecting remotely located rotatable elements is well known. Such drives conventionally take two forms. In one form the flexible transmission element is in the form of a belt and the rotatable elements with which it cooperates are in the form of pulleys, usually grooved, the belt being received within the groove, the operative connection between the belt and the pulley being essentially frictional in nature. In a fairly common modification of this general arrangement the belts are provided with cogs on the pulley-engaging surface thereof, and correspondingly formed teeth are provided on the pulley, thereby to inhibit slippage between the belt and pulley and produce a more accurate drive. The belt teeth or cogs and the cooperating teeth on the pulley are usually designed specially for proper cooperation, but even so they have proved to be rather susceptible to wear, probably because of the fact that the engaging surfaces of belt and pulley tend to accumulate abrasive grit and grime which tends to wear away both engaging parts. Accordingly the belt structures of this type, if they are to have any reasonable degree of reliability, are necessarily complicated and expensive.

With cogged belts of the type above described engagement of the pulleys cooperating therewith can be only on that surface of the belt which is provided with cogs. When power takeoff from both the upper and lower surfaces of the belt is desired it is necessary to provide cogs on both those surfaces, thus adding greatly to the cost of the belt and necessitating the use of belts of quite appreciable thicknesses and hence of appreciable weight. Moreover, belts of this type will tend to move laterally off from the pulleys with which they cooperate, thus requiring that the pulleys be provided with flanges between which the belts are adapted to be received. This adds to the complexity and special design characteristics of the pulley.

Another conventional type of belt drive is of the sprocket type, the sprocket chain being composed of a plurality of assembled elements including laterally extending parts with openings therebetween, the pulleys being in the form of sprocket wheels having teeth specially shaped so as to enter those spaces. This type of drive has the advantage that power takeoff can be accomplished from either side of the belt and lateral movement of the belt off from the pulley is prevented. Because of the large number of parts which make up such belts, however, they are expensive, are not particularly reliable unless relatively massive in size, and are relatively inefficient because of frictional power losses.

Proposals have been made in the past for producing a belt having laterally projecting parts, the belt body being received between opposed pairs of tooth sections on the pulley and the laterally projecting part being received between the teeth. This type of construction prevents lateral escape of the belt from the pulley with which it cooperates and permits power takeoff from both sides of the belt. However, the constructions heretofore proposed in connection with this type of power transmission have not met with success, in part because of the complexity and special design requirements for the various structural elements, and in part because the design of those elements was not properly related to the mechanical requirements inherent in the operation of such systems.

The present invention represents an improved design for the last mentioned type of transmission system, i.e., one in which the belt is provided with lateral projections adapted to be received between circumferentially adjacent tooth sections on the cooperating pulley. In accordance with the present invention the belt and pulley are so cooperatively designed that the pulley may be a conventional spur gear modified in a simple and inexpensive manner so as to drivingly cooperate with the belt of the present invention without impairing its capability to mesh and drivingly cooperate with another conventional gear. Specifically, a conventional spur gear may be converted for use in the system of the present invention merely by forming a groove in the toothed surface thereof intermediate of the thickness thereof, into which groove the body of the belt is adapted to be received. The elements which project laterally from the body of the belt are so designed and spaced as to fit between the conventional gear teeth on the pulley-gear, thereby providing for positive drive between the pulley and the belt. The thickness of the laterally projecting elements on the belt is less than the thickness of the belt body itself, and those elements are preferably disposed on the belts substantially midway of the height thereof. Thus the belt body supports the belt on the pulley and retains it in position, while the laterally extending elements are utilized primarily only to provide a driving engagement with the gear teeth. Hence each part of the belt may be specifically designed to best perform its individual function. For optimum results the laterally projecting elements on the belt should be received between the gear teeth substantially on the pitch circle thereof, thus permitting a given belt to be used with equal effectiveness with gears of different diameters, provided only that the pitch of those gears is substantially the same.

Thus the gear pulley and belt combination of the present invention permits a wide flexibility in system design, and can be used directly with conventional gearing. The belts and gear pulleys cooperate to provide for positive no-slip drive, and the belts are captured within the pulleys and cannot move laterally off therefrom, even though no specially designed flanges need be provided on the pulleys to accomplish that result. The operation of the system is characterized by a lack of backlash, by minimum wear and by low maintenance. Because the gear pulleys can directly engage with conventional driving or driven gears, high speed-change ratios can be achieved in single steps, and without having to employ a multiplicity of elements. The belts can be provided with non-extensible longitudinal strength members embedded therein, thus preventing belt stretch and reliably producing true linear feed of the belt. Because of the minimal wear characteristic of the design of the system of the present invention, deriving in part from the fact that the driving engagement between the pulley and the belt is accomplished at surfaces where grime and grit will not tend to accumulate, and in further part because of the specific cooperative design of the gear teeth and the laterally projecting elements on the belt body which cooperate therewith, the belt structure itself may be exceptionally simple and inexpensive. It may involve merely a unitarily molded body of rubber or plastic, with longitudinal strength members optionally embedded therein at the time of molding for applications where belt stretch is inadmissible, and special wear-resistant coatings or wrappings are not required.

To the accomplishment of the above, and to such other objects as may hereinafter appear, the present invention relates to the construction of a transmission belt and a gear pulley adapted to cooperate therewith, as defined in the appended claims and as described in this specification, taken together with the accompanying drawings, in which:

Figure 4:
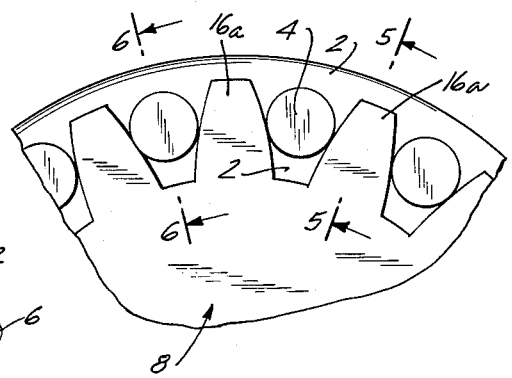
Figure 5:
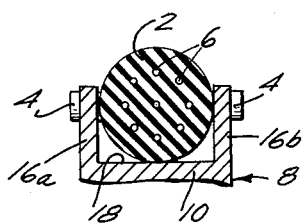
Figure 6:
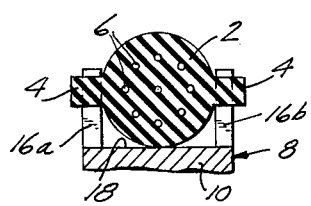

FIG. 4 is a fragmentary side elevational view, on an enlarged scale, of a belt and gear pulley of the present invention in operative engagement; and FIGS. 5 and 6 are cross sectional views taken along the lines 5—5 and 6—6 respectively of FIG. 4.

The transmission belt of the present invention comprises a flexible elongated body 2 having a series of elements 4 extending laterally therefrom and longitudinally spaced therealong, the laterally projecting elements 4 preferably being provided in opposed pairs of elements, one element of each pair extending to each side of the belt body 2. The body 2 may be formed of any suitable flexible structural material, such as rubber or plastice, and longitudinally extending strength members 6, formed of flexible cable Fiberglas, nylon cord or other inextensible material, may be embedded therein to prevent longitudinal stretch of the body 2. The cross-sectional shape of the body 2 is preferably symmetrical about a horizontal plane passing midway through the height thereof, and is here shown as circular in cross-section. The height of the laterally extending elements 4 is less than the height of the body 2, and those elements preferably are located midway of the height of the body 2.

The belt is adapted to be used in conjunction with gear-pulleys generally designated 8 which may be formed form conventional spur gear blanks and, indeed, from conventional spur gears themselves. The gear pulleys 8 comprise a body portion 10 having a central aperture 12 through which a shaft 14 is adapted to pass, the body 10 either rotating thereon or being fixed thereto for rotation therewith a system design requirements dictate. Conventional gear teeth 16 are formed on the outer surface of the body 10, each of those teeth 16 being defined by laterally opposed toothed section 16a and 16b, one at each side of the gear, a groove 18 being formed therebetween. The gear-pulleys 8 may be formed from already constructed spur gears by machining the groove 18 in the toothed surface thereof, that groove 18 preferably extending radially inwardly at least to the base of the teeth so that it defines a smooth bottom surface, as shown. Alternatively, the groove 18 may first be formed in the peripheral surface of the body 8, after which the gear teeth sections 16a and 16b may be formed in conventional manner. The width of the groove 18 is at least as great as, and is preferably closely comparable to, the width of the belt body 2, so that the belt body 2 may readily be received within the groove 18. This, of course, requires that the thickness of the gear pulley body 10 be greater than the thickness of the belt body 2.

When the belt body 2 is received within the groove 18 its laterally projecting elements 4 will enter the spaces between the circumferentially adjacent tooth sections 16a and 16b, and drive between the pulley and the belt will be accomplished by interengagement between the tooth sections 16a, 16b and the projecting elements 4 on the belt. As a result a positive, no-slip drive is accomplished, and since lateral movement of the belt body 2 is restrained by the tooth sections 16a, 16b, the belt is positively prevented from slipping off the pulley.

Figure 1:
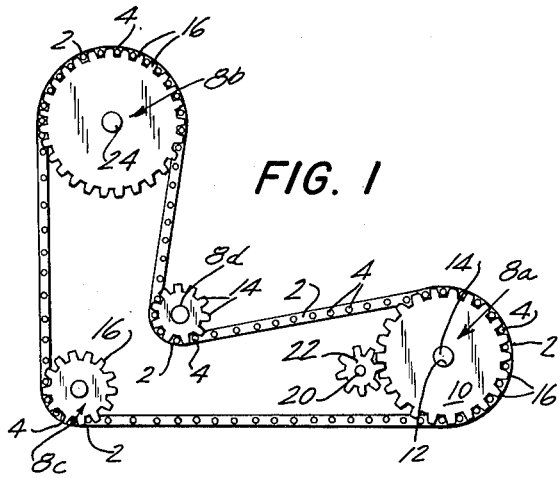
FIG. 1 is a side elevational view of an exemplary transmission system in which the present invention is embodied.

It is preferred that the belt be supported on the pulley primarily by means of the belt body 2 and that substantially none of the strains incident upon supporting the belt on the pulley be carried by the relatively weak lateral projections 4. Hence the height of the lateral projections 4 is appreciably less than the height of the belt body 2, and the size of the projecting elements 4 and their spacing is so correlated with the shape and spacing of the gear teeth 16 that when the belt body 2 rests on the bottom of the groove 18 the projecting elements 4 are freely received between circumferentially adjacent tooth sections 16a, 16b, preferably with a close fit so as to eliminate backlash. The laterally projecting elements 4 are, moreover, substantially centrally located relative to the height of the belt and hence can be used with equal facility with pulleys on either side thereof. (The pulleys 8a, 8b and 8c of the system of FIG. 1 all cooperate with the inner surface of the belt, while the pulley 8d cooperates with the outer surface thereof.) The location of the laterally projecting elements 4 substantially midway of the belt body 2 further facilitates use of a given belt with gear pulleys of different sizes (each of the pulleys 8a, 8b, 8c and 8d of FIG. 1 are of different sizes), since with this arrangement of parts changes in the curvature of the belt body 2 will give rise to minimal changes in the spacing between adjacent laterally projecting elements 4. It is, moreover, preferred that the belt and pulley be so cooperatingly designed that when they are in operative engagement the laterally projecting elements 4 are located substantially along the pitch circle of the gear teeth, thus further ensuring effective and efficient cooperation between belt and gear pulley no matter what the size of the gear pulley nor from what side of the belt engagement with the pulley is made. For best results a given belt can be used with gear pulleys of many different sizes provided only that the pitch of the gear teeth 16 on the pulley corresponds to what may be termed the pitch of the laterally projecting elements 4 on the belt.

The belt may be formed in a single molding operation, the body 2 and the laterally projecting elements 4 being integral with one another. The belt may be molded in situ about the longitudinally extending strength members 6 when such strength members are employed.

Since the actual driving engagement between the belt and gear pulley occurs along the vertically extending edges of the gear tooth sections 16a and 16b and the sides of the belt elements 4, wear is minimal. If dirt or grime accumulates on the belt or the pulley it will accumulate on surfaces other than those which provide the actual power drive, so that the effect of such abrasive materials on the life of the belt will be truly minimal. Actually the engaging surfaces will tend to have a wiping effect with one another before firm engagement is made therebetween, thus in effect ensuring a clean and non-abrasive interaction.

By way of specific example, a continuous belt may be formed the inner diameter of the body 2 of which is 3.983 inch and the outer diameter of which is 4.169 inch. The laterally extending elements 4 may have a diameter of .054 inch, and may be centrally located relative to the height of the belt body 2, the centers of the elements 4 falling on the diametral pitch circle of the belt, which has a diameter of 4.076 inch. One hundred twenty-eight elements 4 are provided on each side of the belt body 2 and equally spaced therearound. This belt may be used most effectively with 32 pitch toothed pulleys 8 of a wide variety of sizes. For pulleys 8 with different tooth pitches, different sizes and spacings of belt elements 4 could be provided for best results.

Figure 2:
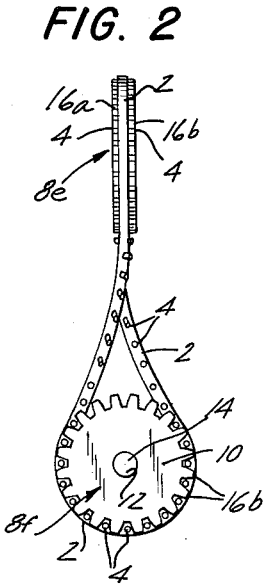
FIG. 2 is a front elevational view of an alternative system in which the axis of the pulleys over which the belt passes are at right angles to one another.
Figure 3:
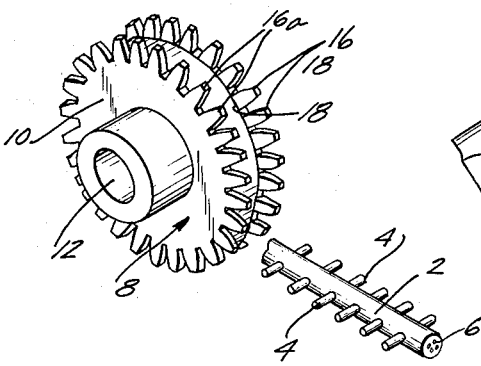
FIG. 3 is a three-quarter perspective exploded view of a typical embodiment of the belt and the gear-pulley of the present invention.

FIGS. 1 and 2 illustrate in a schematic manner some of the advantages of the belt-pulley combination of the present invention. In the system of FIG. 1 the drive shaft 20 rotates pinion gear 22. That gear meshes directly with the belt driving pulley 8a, the teeth on the pinion 22 meshing with the comparable teeth 16 on the pulley 8a. Thus a desired degree of speed reduction may be accomplished directly between the driving gear 22 and the pulley 8a, without requiring the use of an additional gear. The belt, when driven by the pulley 8a, rotates the pulleys 8b, c and d, and power may be taken off from any one of them. For example, pulley 8b, which is larger than pulley 8a, may be utilized as the output pulley, its shaft 24 constituting the output shaft of the system. In view of the fact that the pulley 8b is larger than the pulley 8a, and in further view of the fact that there is direct positive drive between the pulleys 8a and 8b, a further accurate degree of speed reduction is obtained. Since the belt is readily flexible and may be used with pulleys of different diameters, it is feasible to employ idler pulleys 8c and 8d of different sizes, and if desired power may be taken directly from any of them either via the shafts on which they are mounted or by having them directly mesh with other gears in a manner similar to the engagement between gear 22 and pulley 8a.

Because the tooth sections 16a and 16b to either side of the groove 18 reliably retain the belt in position on the pulley and prevent it from moving laterally off therefrom, the belt of the present invention can provide direct no-slip drive between pulleys with non-parallel axes of rotation, such as the pulleys 8e and 8f in FIG. 2, whose axes of rotation are at right angles to one another.

By reason of the specific design of the belts and pulleys of the present invention a transmission system is produced which provides for great flexibility in design, which permits use of readily modified standard gears as pulleys without destroying their capability of functioning as gears per se, and a simple and inexpensive belt construction may be used which will, nevertheless, be reliable and long lived.

While but a single embodiment of the present invention has been here disclosed, it will be apparent that many variations may be made therein without departing from the spirit of the invention defined in the following claims.

I claim:

1. A transmission belt comprising a flexible elongated body portion, and a series of registering pairs of elements extending laterally from both sides of said body portion and spaced along the length thereof, said elements having a height less than that of said body portion and being substantially centrally located relative to the height of said body portion, said body portion being substantially circular in cross section, said body portion and said elements being integrally molded from plastic material.

2. A transmission belt comprising a flexible elongated body portion substantially symmetrical about both horizontal and vertical dividing planes, and a series of registering pairs of elements extending laterally from both sides of said body portion and spaced along the length thereof, said elements having a height less than that of said body portion and being substantially centrally located relative to the height of said body portion, said body portion and said elements being integrally molded from plastic material.

3. A transmission belt comprising a flexible elongated body portion, and a series of registering pairs of elements extending laterally from both sides of said body portion and spaced along the length thereof, said elements having a height less than that of said body portion and being substantially centrally located relative to the height of said body portion, said body portion and said elements being substantially circular in cross section, said body portion and said elements being integrally molded from plastic material.

4. In combination with the transmission belt of claim 1, a gear having a width greater than that of said body portion of said belt, having gear teeth thereon, and having a groove, of a width at least equal to that of said body portion of said belt, substantially centrally formed in the toothed surface thereof and passing through said gear teeth, thereby separating said gear teeth into a pair of sections, one on each side of said groove, into which groove said body portion of said belt is adapted to be received, the circumferential spacing between the gear teeth being such as to receive said elements between circumferentially adjacent gear teeth sections.

5. The combination of claim 4, and a second gear in mesh with said first named gear.

6. In combination with the transmission belt of claim 2, a gear having a width greater than that of said body portion of said belt, having gear teeth thereon, and having a groove, of a width at least equal to that of said body portion of said belt, substantially centrally formed in the toothed surface thereof and passing through said gear teeth, thereby separating said gear teeth into a pair of sections, one on each side of said groove, into which groove said body portion of said belt is adapted to be received, the circumferential spacing between the gear teeth being such as to receive said elements between circumferentially adjacent gear teeth sections.

7. The combination of claim 6, and a second gear in mesh with said first named gear.

8. In combination with the transmission belt of claim 3, a gear having a width greater than that of said body portion of said belt, having gear teeth thereon, and having a groove, of a width at least equal to that of said body portion of said belt, substantially centrally formed in the toothed surface thereof and passing through said gear teeth, thereby separating said gear teeth into a pair of sections, one on each side of said groove, into which groove said body portion of said belt is adapted to be received, the circumferential spacing between the gear teeth being such as to receive said elements between circumferentially adjacent gear teeth sections.

9. The combination of claim 8, and a second gear in mesh with said first named gear.

10. In combination with the transmission belt of claim 1, a gear having a width greater than that of said body portion of said belt, having gear teeth thereon, and having a groove, of a width at least equal to that of said body portion of said belt, substantially centrally formed in the outer surface thereof, passing through said gear teeth, and extending radially at least for the full depth of said teeth, thereby having a smooth bottom surface and separating said gear teeth into a pair of sections, one on each side of said groove, into which groove said body portion of said belt is adapted to be received, the circumferential spacing between the gear teeth being such as to substantially snugly receive said elements between circumferentially adjacent gear teeth sections when said body portion of said belt rests on the bottom of said groove.

11. The combination of claim 10, and a second gear in mesh with said first named gear.

12. In combination with the transmission belt of claim 2, a gear having a width greater than that of said body portion of said belt, having gear teeth thereon, and having a groove, of a width at least equal to that of said body portion of said belt, substantially centrally formed in the outer surface thereof, passing through said gear teeth, and extending radially at least for the full depth of said teeth, thereby having a smooth bottom surface and separating said gear teeth into a pair of sections, one on each side of said groove, into which groove said body portion of said belt is adapted to be received, the circumferential spacing between the gear teeth being such as to substantially snugly receive said elements between circumferentially adjacent gear teeth sections when said body portion of said belt rests on the bottom of said groove.

13. The combination of claim 12, and a second gear in mesh with said first named gear.

14. In combination with the transmission belt of claim 3, a gear having a width greater than that of said body portion of said belt, having gear teeth thereon, and having a groove, of a width at least equal to that of said body portion of said belt, substantially centrally formed in the outer surface thereof, passing through said gear teeth, and extending radially at least for the full depth of said teeth, thereby having a smooth bottom surface and separating said gear teeth into a pair of sections, one on each side of said groove, into which groove said body portion of said belt is adapted to be received, the circumferential spacing between the gear teeth being such as to substantially snugly receive said elements between circumferentially adjacent gear teeth sections when said body portion of said belt rests on the bottom of said groove.

15. The combination of claim 14, and a second gear in mesh with said first named gear.

References Cited in the file of this patent

UNITED STATES PATENTS

| | | |
|---|---|---|
| 595,051 | Elieson | Dec. 7, 1897 |
| 2,117,611 | Karle | May 17, 1938 |
| 2,782,461 | Esslinger | Feb. 26, 1957 |
| 2,838,946 | Kiekhaefer | June 17, 1958 |

FOREIGN PATENTS

| | | |
|---|---|---|
| 867,178 | Germany | Feb. 16, 1953 |